F. W. SHUPERT & H. W. JACOBS.
SECTIONAL FIRE BOX.
APPLICATION FILED SEPT. 11, 1907.
917,172.
Patented Apr. 6, 1909.
6 SHEETS—SHEET 1.
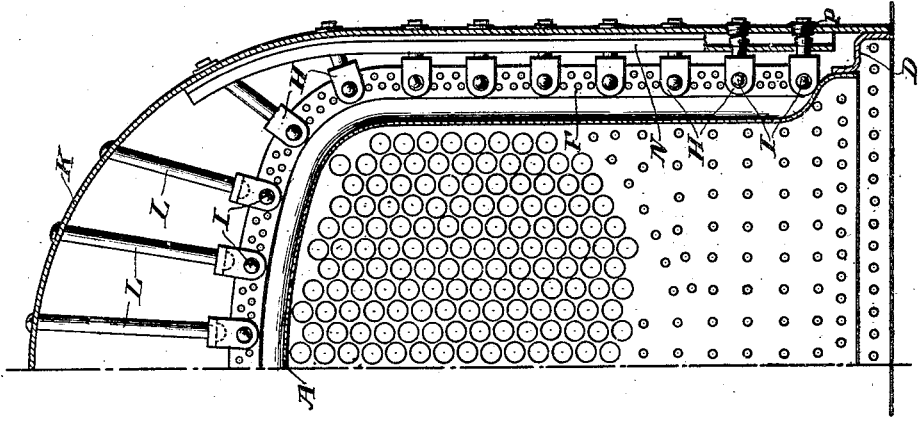
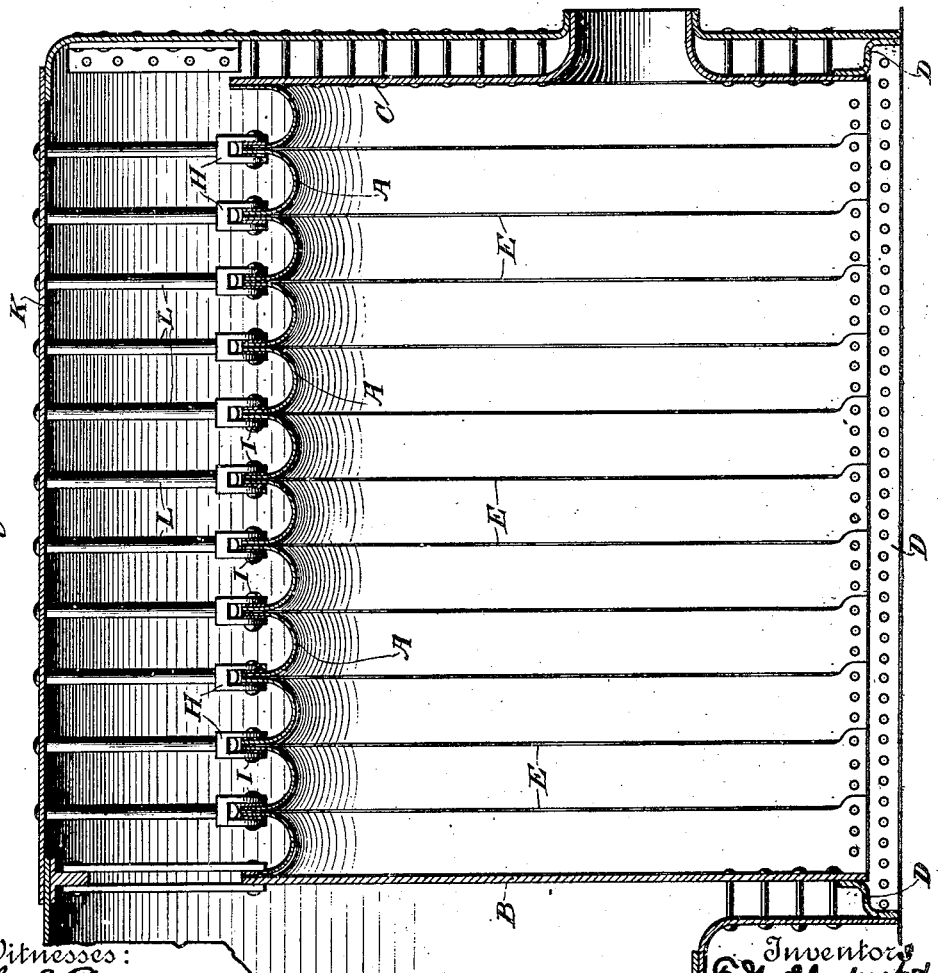

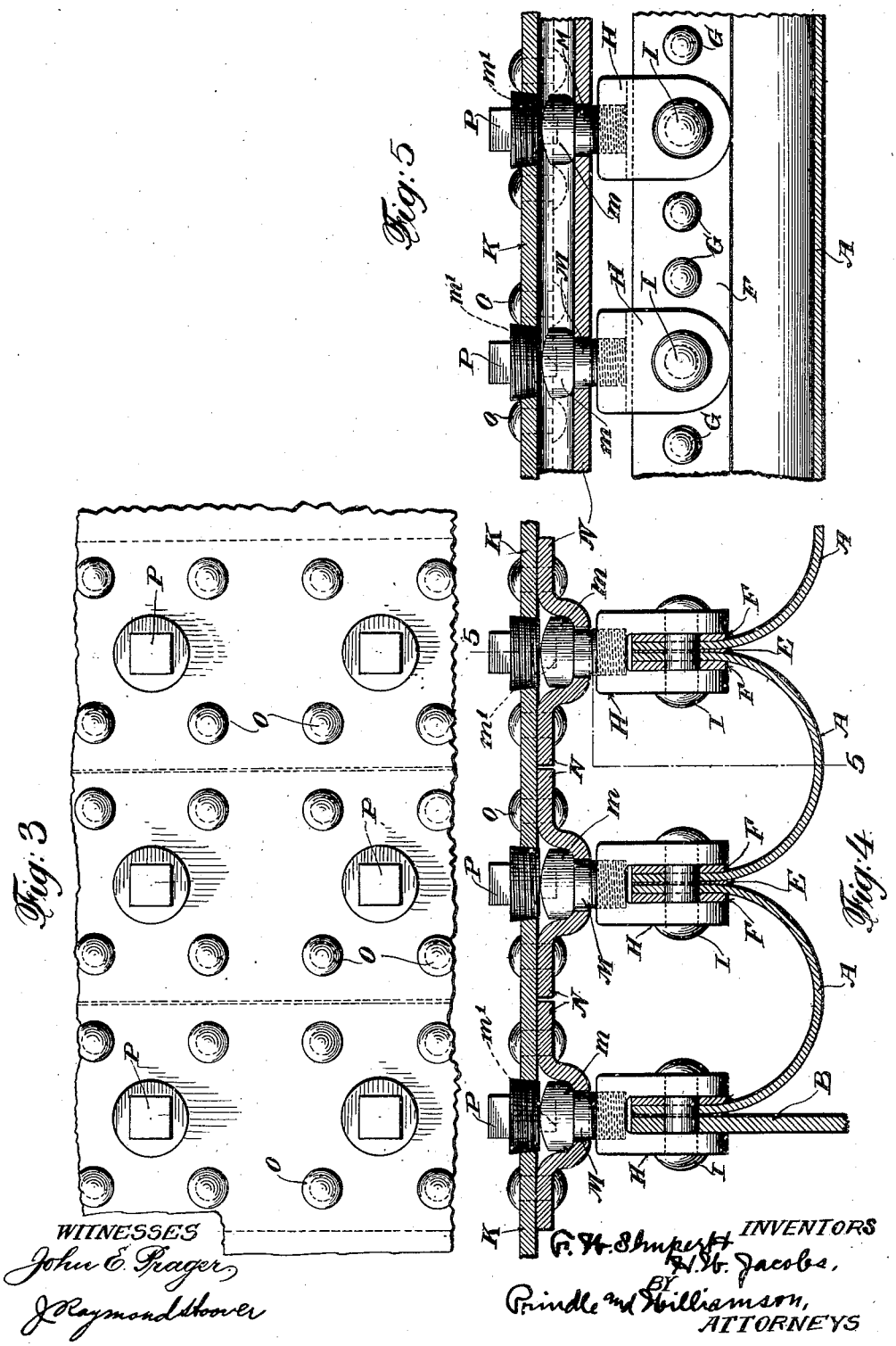

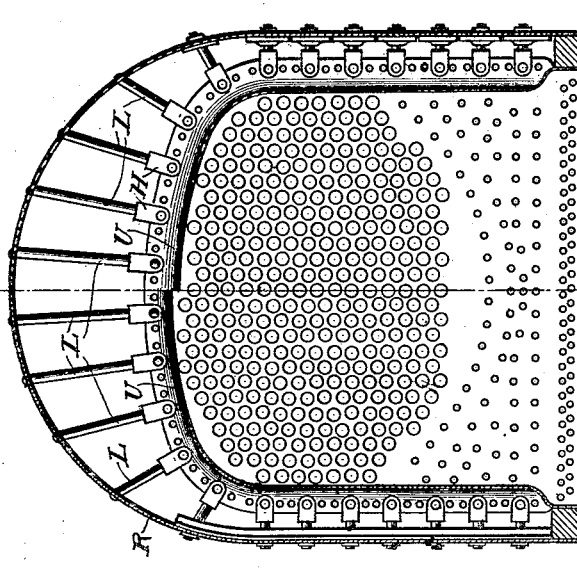
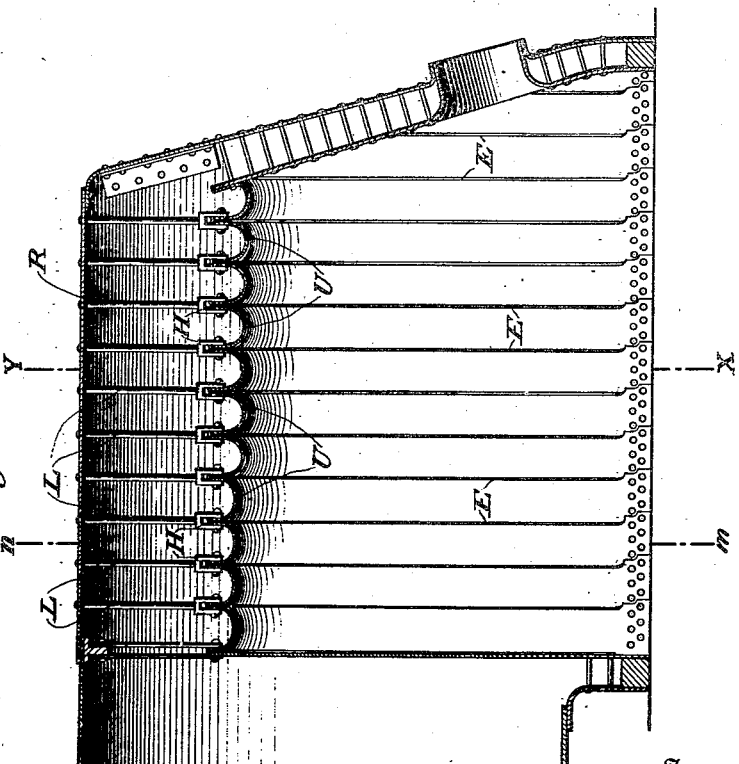

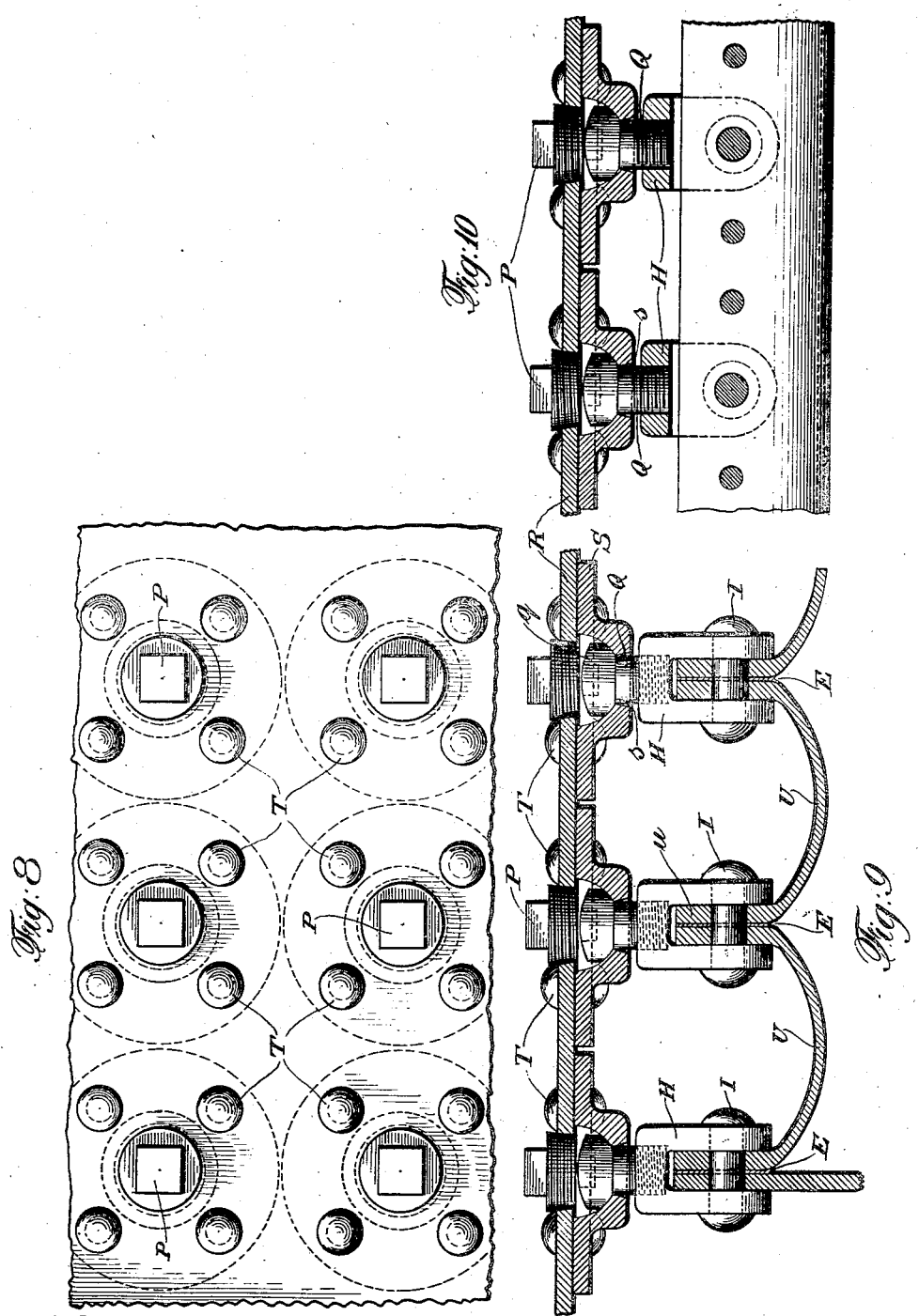

F. W. SHUPERT & H. W. JACOBS.
SECTIONAL FIRE BOX.
APPLICATION FILED SEPT. 11, 1907.
917,172.
Patented Apr. 6, 1909.
6 SHEETS—SHEET 5.
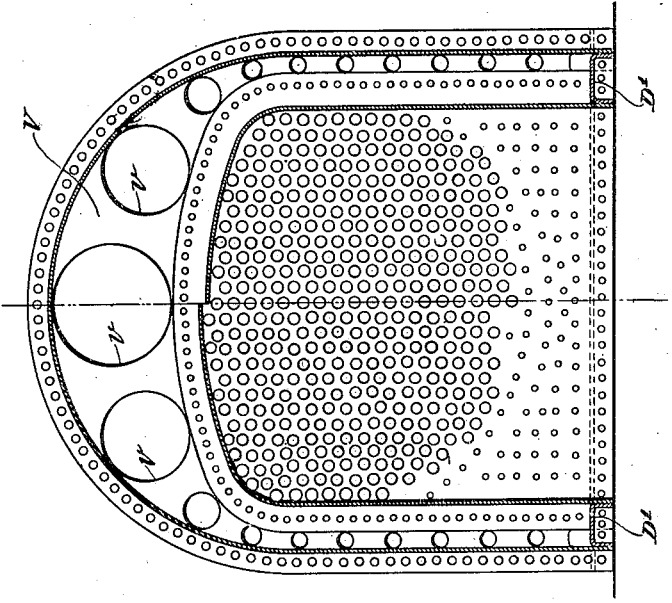
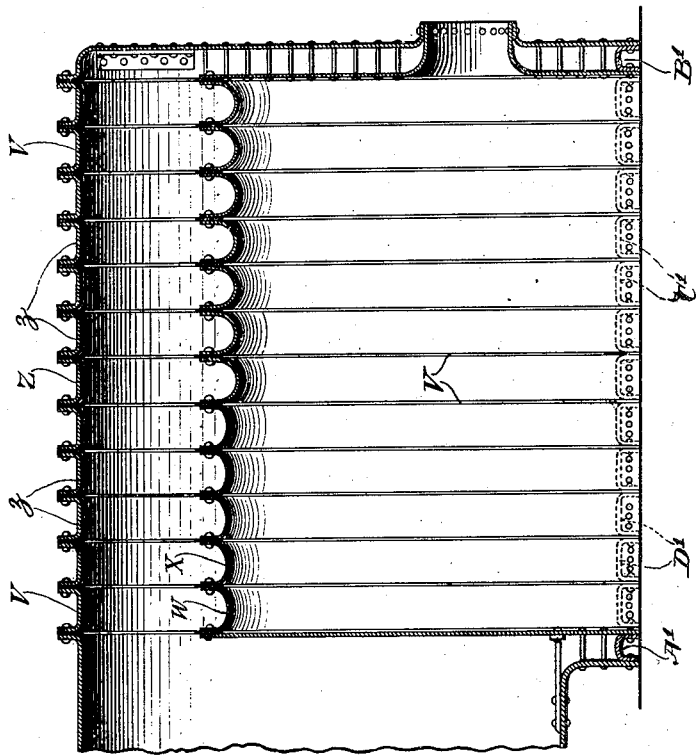

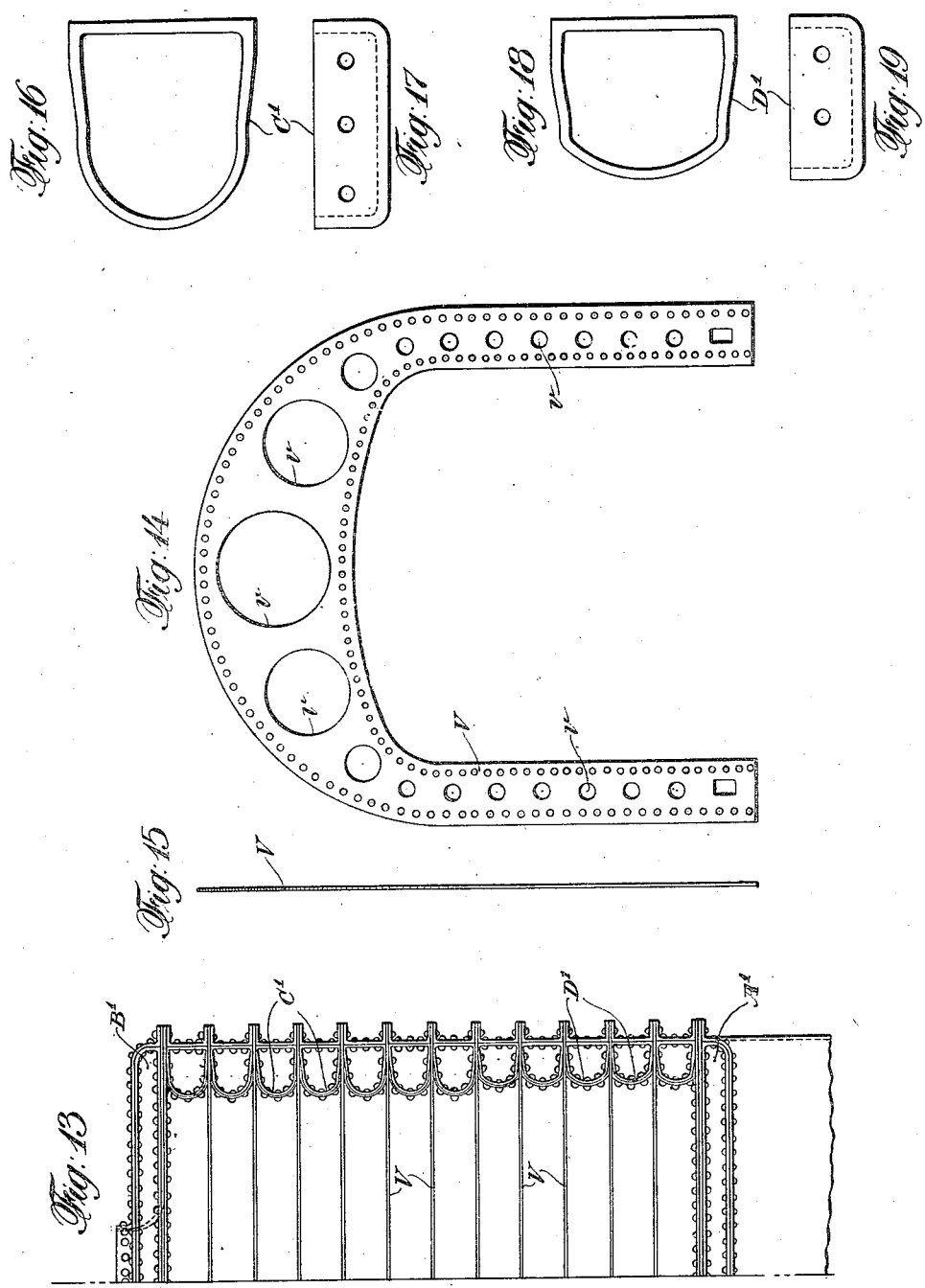

UNITED STATES PATENT OFFICE.

FRANK W. SHUPERT, OF SAN BERNARDINO, CALIFORNIA, AND HENRY W. JACOBS, OF TOPEKA, KANSAS, ASSIGNORS TO THEMSELVES AS TRUSTEES.

SECTIONAL FIRE-BOX.

No. 917,172.  Specification of Letters Patent.  Patented April 6, 1909.

Application filed September 11, 1907. Serial No. 392,898.

*To all whom it may concern:*

Be it known that we, FRANK W. SHUPERT, of the city of San Bernardino, county of San Bernardino, State of California, and HENRY W. JACOBS, of the city of Topeka, county of Shawnee, State of Kansas, have invented a certain new and useful Improvement in Sectional Fire-Boxes, and do hereby declare that the following is a full, clear, and exact description thereof, reference being had to the accompanying drawings, in which—

Figure 1 is a longitudinal, sectional view of a fire-box embodying the invention; Fig. 2 is a transverse sectional view of Fig. 1; Fig. 3 is a partial side elevation of a waterleg; Fig. 4 is a sectional view of Fig. 3; Fig. 5 is a view on the line 5—5 of Fig. 4; Fig. 6 illustrates the application of the invention to a fire-box having the back end built at an angle to the vertical; Fig. 7 is a transverse sectional view of Fig. 6, the right half of Fig. 7 being taken on the line x—y of Fig. 6, and the left half of Fig. 7 being taken on the line m—n of Fig. 6; Figs. 8, 9 and 10 are views similar to Figs. 3, 4 and 5, illustrating another embodiment of the manner of staying; Fig. 11 is a longitudinal sectional view of another embodiment of my invention; Fig. 12 is a transverse sectional view of the fire-box of Fig. 11, the right side showing a section taken on the line x—y, and the left side showing a section taken on the line m—n. Fig. 13 is a half plan of the bottom of a fire-box showing the shape of the sectional mud ring. Figs. 14 and 15 are respectively side and end elevations of a stay sheet. Figs. 16 and 17 are respectively a plan view and a side elevation of one mud ring section; and Figs. 18 and 19 are similar views of another mud ring section.

The object of the invention has been to devise a fire-box having any or all of the following advantages: That of having such flexibility as will prevent all unequal or excessive strains, such as the crown and side sheets of the ordinary fire-box are subjected to. That of preventing the heads of the stay-bolts on the side and crown sheets from coming in direct contact with the flame. That of having all side and crown sheets flexible. That of having few and large stays. That of preventing the exposure of all seams about the fire-box to the flame. That of increasing the steaming power of the boiler by having thinner fire-box sheets, and increasing the heating surface in the fire-box in such a manner as to expose the surface to the flame in a more effective way than has heretofore been done. That of having a sectional fire-box that can be easily repaired. That of having a flexible mudring; and to such ends the invention consists in the sectional fire-box hereinafter specified.

In carrying the invention into practice, the fire-box is made up of sections A, formed of comparatively thin material and U-shape in cross-section. The foremost section A is riveted to the flue-sheet B; the sections A are riveted to each other, and the rearmost section A is riveted to the inner back-sheet C. The bottoms of the sections A are overlapped and are riveted to an angle-plate D. Copper calking strips E may be placed between the flanges of the sections A where they are riveted together, and on each side of the said flanges strips or plates F may be placed, rivets G passing through both of the strips F, flanges of the sections A and the copper calking strips, insuring a tight joint. The seams can easily be calked from the inside of the fire-box, thus easily stopping any leak that may be started in the seams. In order to support the sections A from the shell against the pressure tending to force them inward upon the fire, slings H are secured to the said flanges by rivets I passing through the slings, the strips F and the said flanges. Along the top of the fire-box the slings H are connected with the shell K by means of stays L, which are swiveled in the slings, threaded in the shell sheet, and headed over onto the outside of said sheet. In the waterlegs the slings H have threaded into them stay-bolts M, whose heads m are held to the shell by means of channel-strips N that are secured to the shell by rivets O. The stay-bolts have round heads and they are passed through holes in the shell sheet which are closed by means of water-plugs P, the latter being preferably of tapered form. The heads m of the stay-bolts are provided with square sockets m' and the stay-bolts can be removed by first removing the corresponding plug P and then unscrewing the stay-bolt by means of a male-wrench fitted into the square socket in the stay-bolt. This construction also enables the stay-bolts to be shortened or lengthened as desired.

It will be observed that the fire-box illustrated in Figs. 1 to 5 has, among others, the following advantages: Owing to the U-shape of the sections A, the fire-box is flexible and can yield to all strains caused by unequal heat or other causes, without unduly communicating such strains to the flues and side sheets, as in the ordinary fire-box. The stay-bolt heads are not exposed to direct contact with the flame, and there is, therefore, no danger of their being burned. The crown and side sheets are all flexible, thus enabling them to adapt themselves to strains so that practically the only strains to which they are subjected are tensile strains which are the strains they are best able to maintain. This results in a very low cost of maintenance, owing to the fact that there is little danger of breakage of stay-bolts. It also enables the use of fewer stays than heretofore, and, therefore, larger ones, and as the stays are only subjected to tensile strains, they can be made of steel instead of iron, without danger of breaking. The increased size of the stay-bolts makes them less subject to corrosion than smaller ones. None of the seams of the fire-box are exposed to the flames, a condition which results in the least possible leakage at the seams. The form of the sections A is such as to increase the heating surfaces in the most effective manner, and to permit the use of thinner fire-box sheets than in the ordinary construction, thus increasing the steaming power of the boiler. The sectional construction of the fire-box permits the removal of any defective section without necessitating the throwing away of the entire crown sheet. It is only necessary to replace the injured section by a new one.

In that embodiment of the invention shown in Figs. 6 and 7, the invention is shown as applied to a boiler in which the back end of the boiler is at an angle with the vertical. The details of the construction are the same as those illustrated in the earlier figures, except in the following particulars: The left water-leg has the same form of staying as that illustrated in the earlier figures. The right water-leg, however, shows each stay-bolt Q independently secured in the shell sheet R. The bolts Q preferably have heads $q$ that are spherical on the underside, and these heads are seated in spherical sockets formed in plates S which are preferably circular, the said plates being independently secured in the shell sheets by rivets T. A hole $s$ through the plate S for the passage of the bolt Q is also made flaring so that there is room for the bolt to swing as its head turns in its spherical socket. This construction makes, in effect, a ball and socket joint between the stay-bolts and the shell sheet and thus enables the bolts to readily adapt themselves to all changes in the relative positions of the parts which they connect. In this embodiment of the invention, no strips are shown upon each side of the flanges $u$ of the sections U, said flanges being made of sufficient thickness to enable them to be rigidly secured together.

In that embodiment of my invention which is shown in Figs. 11 to 19 inclusive, the construction, except in those particulars pointed out, is substantially the same as in the preceding figures. Instead of using stay-bolts, stay-plates V, of the form illustrated in Figs. 14 and 15, are placed between the sections W and X of the crown sheet and riveted in place. The outer shell Z instead, as heretofore, of being made of a single sheet is made of a series of sections $z$ that are channel-shape in cross-section, their forward and rear edges being turned upward to form flanges, and the said flanges receiving between them the outer edges of the said sheets V, and being riveted thereto. The said sheets V have holes $v$ formed therein to afford a ready circulation of water and steam. The rear end of the fire-box is of the ordinary rigid stay type. The mud ring is preferably formed by cup-shape sections which are riveted into the open spaces of the lower ends of the water-legs. The mud ring sections A' and B', at the front and rear, are long and straight. The mud ring sections C' and D' are of the form shown in Figs. 16 and 17 and 18 and 19 respectively. The sections C' are to close the water-legs whose crown sheet sections are semicircular in form, and the sections D' are to close the water-legs whose crown sheet sections are elliptical in form. These mud ring sections are of boiler steel and may be flanged into place while hot, thus insuring tight seams.

The forming of the shell sheet in sections has decided advantages. Any one section may be removed and replaced without necessity for discarding the entire shell sheet. The rivets are on the outside and are easily gotten at. In this form of our invention, as in those previously described, there are no rivet or bolt heads exposed to the fire to be burned off.

It is obvious that various changes can be made in the above illustrated construction, which will embody the principles of the invention, and it is desired that the claims be given the broadest interpretation of which they are capable, consistent with the prior art.

We claim:—

1. In a boiler, a fire-box consisting of the combination of a series of flexible sheet metal inner sections, U-shape in cross-section, the flanges of said sections extending outward, said sections being riveted together, and having their surfaces which are exposed to the fire bulge toward the fire, and an outer shell to which each of said sections is fastened.

2. In a boiler, a fire-box consisting of the combination of a series of U-shaped sections having their flanges secured together, the surfaces exposed to the fire being bulged toward the fire, and an outer shell to which each of said flanges is connected, said outer shell being made of a corresponding series of sections.

3. In a boiler, a fire-box consisting of an inner shell and an outer shell, said inner shell comprising a series of U-shaped sections having flanges projecting outwardly and secured together, the surfaces of which that are exposed to the fire being bulged toward the fire, a rear flue sheet and an inner back sheet to which the front and rear sections respectively are riveted, all of the joints between such parts being formed transversely to the length of the fire-box, whereby all of the rivets used in such joints may be protected from the fire, and means connecting each of said sections to the outer shell of the fire-box.

4. In a boiler, a fire-box comprising inner and outer shells, the inner section being formed of U-shaped sections, the flanges of which project outwardly, the surfaces of said sections exposed to the fire being bulged toward the fire, the said outer shell being composed of U-shaped sections having outwardly projecting flanges, and stay plates riveted between the flanges of adjacent inner sections and between the flanges of adjacent outer sections.

5. In a boiler, a fire-box comprising inner and outer shells, the inner section being formed of U-shaped sections, the flanges of which project outwardly, the surfaces of said sections exposed to the fire being bulged toward the fire, the said outer shell being composed of U-shaped sections having outwardly projecting flanges, stay plates riveted between the flanges of adjacent inner sections and between the flanges of adjacent outer sections, a rear flue sheet, a stay plate interposed between the outwardly projecting flange of the adjacent inner section and said flue sheet and riveted thereto, said stay plate being riveted between adjacent sections of the outer shell.

6. In a boiler, a fire-box comprising inner and outer shells, the inner shell being formed of U-shaped sections, the flanges of which project outwardly, the surfaces of said sections exposed to the fire being bulged toward the fire, the said outer shell being composed of U-shaped sections having outwardly projecting flanges, stay plates riveted between the flanges of adjacent inner sections and between the flanges of adjacent outer sections, a rear flue sheet, a stay plate interposed between the outwardly projecting flange of the adjacent inner section and said flue sheet and riveted thereto, said stay plate being riveted between adjacent sections of the outer shell, an inner rear sheet, a stay plate riveted between said sheet and the outwardly projecting flange of the adjacent inner section, and an outer rear sheet, said stay plate being riveted between the outwardly projecting flange of the corresponding outer section and an outwardly projecting flange formed on the rear outer sheet.

7. In a boiler, a fire-box consisting of the combination of an inner shell and an outer shell, said shells being formed of corresponding U-shaped sections having outwardly projecting flanges, the surfaces of the inner sections which are exposed to the fire being bulged toward the fire, and means for staying said inner sections from said outer sections, the side walls of the fire-box being vertical.

8. In a boiler, the combination of a shell, a flue-sheet, an inner back sheet, sheet metal sections forming the fire-box, said sections having outwardly projecting flanges that are secured together, the front section being secured to said flue-sheet, and the rear section being secured to said inner back sheet, and stays connecting said sections with said shell.

9. In a boiler, a fire box consisting of transverse sections united together, and a mud ring composed of corresponding sections.

10. In a boiler, a fire box consisting of transverse sections comprising open-bottomed water-legs, and a mud ring composed of cup-shaped sections fastened in said open bottoms.

11. In a boiler, a fire box consisting of the combination of an outer shell, an inner shell formed of a series of U-shaped sections having their flanges secured together, the surfaces exposed to the fire being bulged toward the fire, and stay plates secured to said flanges and to the outer shell, said stay plates being provided with openings to afford communication between the sections.

12. In a boiler, the combination of a shell, a flue-sheet, an inner back sheet, sheet metal sections forming the fire-box, said sections having outwardly projecting flanges that are secured together, the front section being secured to said flue-sheet, the rear section being secured to said inner back sheet, stays connecting said sections with said shell, the feet of said sections being flattened and overlapping, and an angle-plate secured to said feet and to said shell.

13. In a boiler, a fire-box consisting of shell and crown sheets made up of transverse U-shape sections, stay sheets that are riveted into the seams formed by said sections, whereby each pair of sections forms a pair of water-legs, and cup-shape mud-ring sections inserted into the bottoms of said water-legs and secured in place.

14. In a boiler, a fire-box consisting of shell and crown sheets made up of transverse U-shape sections, stay sheets that are riveted into the seams formed by said sections, whereby each pair of sections forms a pair of water-legs, and inverted cup-shape mud-ring sections inserted into the bottoms of said water-legs and secured in place.

In testimony that we claim the foregoing we have hereunto set our hands.

FRANK W. SHUPERT.
HENRY W. JACOBS.

Witnesses:
W. E. LEONARD,
J. E. LANTS.